United States Patent
Kohtani et al.

(10) Patent No.: US 6,271,927 B1
(45) Date of Patent: *Aug. 7, 2001

(54) MULTI-FUNCTIONAL IMAGE PROCESSING APPARATUS

(75) Inventors: Hideto Kohtani, Yokohama; Satoshi Kaneko, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/901,285

(22) Filed: Jul. 29, 1997

Related U.S. Application Data

(63) Continuation of application No. 08/424,182, filed on Apr. 19, 1995.

(30) Foreign Application Priority Data

Apr. 20, 1994 (JP) ................................. 6-082009

(51) Int. Cl.$^7$ .................................................. B41B 15/00
(52) U.S. Cl. ....................... 358/1.16; 358/1.14; 358/1.13; 358/444
(58) Field of Search ..................... 358/468, 444, 358/404, 401, 440, 442, 296, 437, 441, 1.9, 1.14, 1.16; 395/114, 115, 117, 185.01, 109, 113, 112, 101; 707/530; 399/11, 16, 403, 15; 101/471, 468, 483, 484; 710/129, 21, 27; 709/250

(56) References Cited

U.S. PATENT DOCUMENTS

| | | | |
|---|---|---|---|
| 4,432,020 | * | 2/1984 | Onose et al. ................... 358/434 |
| 4,995,103 | * | 2/1991 | Tsukada et al. ................ 358/451 |
| 5,095,369 | * | 3/1992 | Ortiz et al. .................... 358/296 |
| 5,113,355 | * | 5/1992 | Nomura ......................... 395/115 |
| 5,164,842 | * | 11/1992 | Gauronski et al. ............. 358/444 |
| 5,194,967 | * | 3/1993 | Nonomura ..................... 358/434 |
| 5,377,016 | * | 12/1994 | Kashiwagi et al. ............. 358/468 |
| 5,410,419 | * | 4/1995 | Muramatsu et al. ............ 358/468 |
| 5,428,457 | * | 6/1995 | Okumura et al. ............... 358/403 |
| 5,519,883 | * | 5/1996 | White et al. ................... 710/129 |
| 5,587,799 | * | 12/1996 | Kawamura et al. ............. 358/404 |
| 5,964,156 | * | 10/1999 | Smith et al. ................... 101/471 |

FOREIGN PATENT DOCUMENTS

29343 * 2/1987 (JP) ..................................... 358/468

* cited by examiner

*Primary Examiner*—Cheukfan Lee
(74) *Attorney, Agent, or Firm*—Fitzpatrick, Cella, Harper & Scinto

(57) ABSTRACT

Job commands including priority conditions of each of a plurality of functions of a multifunctionable image forming processing apparatus are sent from a device connected to a network. A multifunctionable image processing apparatus receives these commands and recognizes the aforementioned priority conditions of these commands, and, based on these priority conditions, determines the image processing execution order to execute the jobs. For example, priority conditions may be in accordance with execution time, execution costs, output quality, output, and command function completion. When priority is in accordance with output, a portion of the jobs are removed during image processing and executed, while when priority is in accordance with execution time, execution cost, or output quality, the processing time is controlled during image processing. When priority is in accordance with command function completion, image processings which do not satisfy the conditions for performing the indicated image forming completely are skipped.

35 Claims, 11 Drawing Sheets

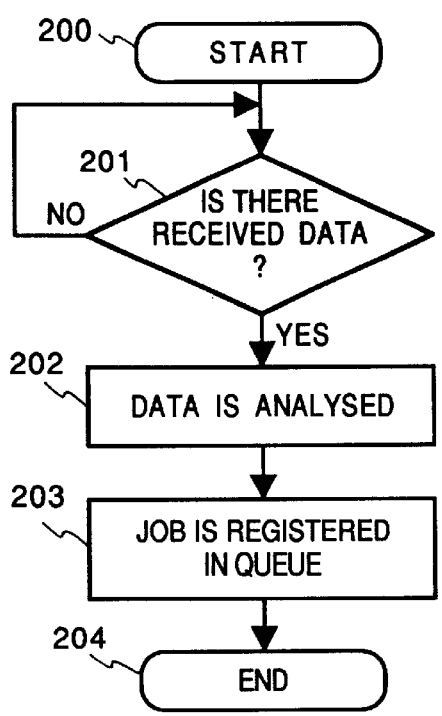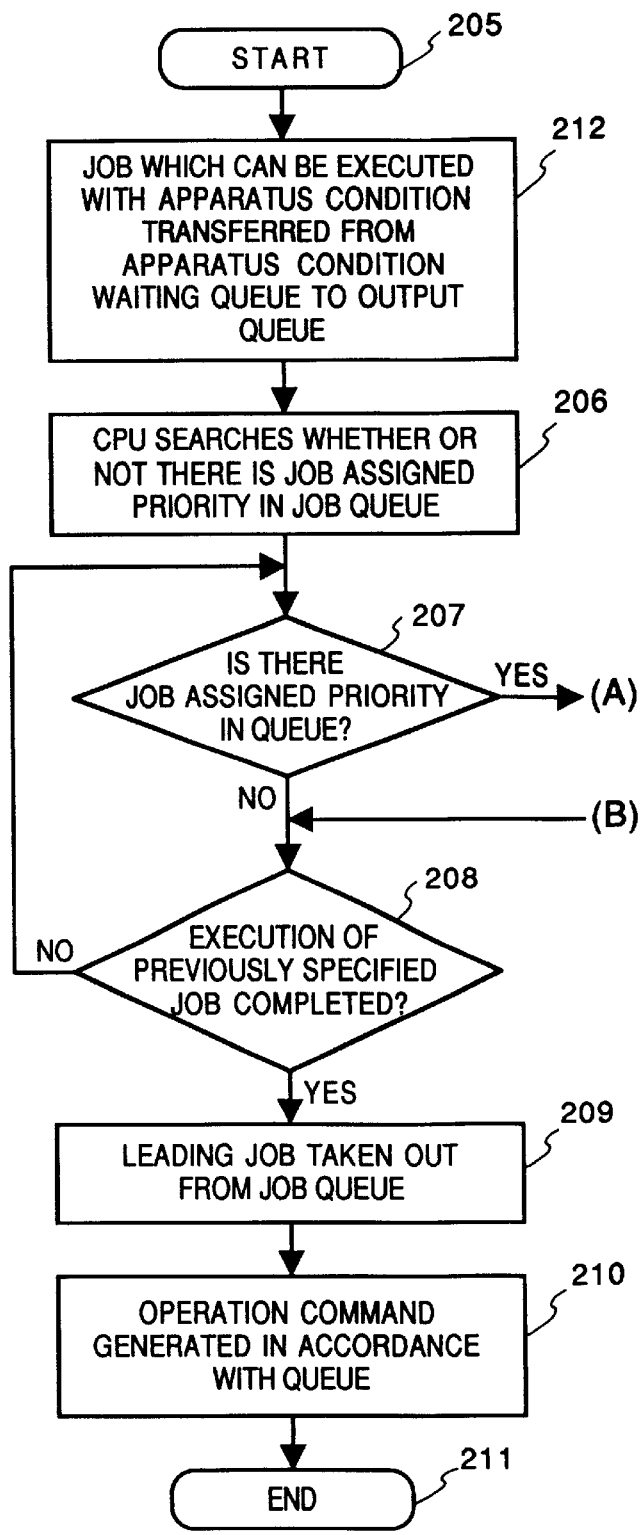

FIG. 7

PRIORITY STATUS OF EACH JOB

| | |
|---|---|
| | |
| | |
| | |
| ⋮ | EXECUTION TIME PRIORITY |
| JOB 4 | |
| JOB 3 | |
| JOB 2 | |
| JOB 1 | |

↓

PRIORITY STATUS OF EACH JOB

| | |
|---|---|
| | |
| | |
| | |
| ⋮ | |
| JOB 3 | |
| JOB 2 | |
| JOB 1 | |
| JOB 4 | EXECUTION TIME PRIORITY |

FIG. 8

PRIORITY STATUS OF EACH JOB

| | |
|---|---|
| | |
| | |
| | |
| ⋮ | ⋮ |
| | |
| JOB 4 | |
| JOB 3 | |
| JOB 2 | EXECUTION TIME PRIORITY |
| JOB 1 | |

PRIORITY STATUS OF EACH JOB

| | |
|---|---|
| | |
| | |
| | |
| ⋮ | ⋮ |
| | |
| JOB 4 | |
| JOB 3 | |
| JOB 1 | |

JOB EXECUTION TIME

| | |
|---|---|
| | |
| | |
| | |
| ⋮ | ⋮ |
| | |
| JOB 2 | AA:BB:CC |
| JOB Y | |
| JOB X | |

FIG. 10

PRIORITY STATUS OF EACH JOB

|  |  |
|---|---|
|  |  |
|  |  |
|  |  |
| ⋮ | ⋮ |
|  |  |
| JOB 4 |  |
| JOB 3 |  |
| JOB 2 |  |
| JOB 1 |  |

— SPECIFICATION FUNCTION COMPLETION PRIORITY

PRIORITY STATUS OF EACH JOB

|  |  |
|---|---|
|  |  |
|  |  |
|  |  |
| ⋮ | ⋮ |
|  |  |
| JOB 4 |  |
| JOB 3 |  |
| JOB 1 |  |

APPARATUS STATE WATING CONDITION

|  |  |
|---|---|
|  |  |
|  |  |
|  |  |
| ⋮ | ⋮ |
|  |  |
| JOB 2 | WATING CONDITION |
| JOB Z |  |
| JOB W |  |

MULTI-FUNCTIONAL IMAGE PROCESSING APPARATUS

This application is a continuation of application Ser. No. 08/424,182 filed Apr. 19, 1995.

BACKGROUND OF THE INVENTION

1. Field of the Invention

The present invention relates to a multifunctionable image processing apparatus.

2. Description of the Related Art

In recent years, an image processing apparatus having a copy function, a facsimile communication function, printer function, etc. has been considered.

A job operation instruction which is generated to such an image processing apparatus did not include information specifying job priority conditions. In an image processing apparatus which externally receives job instructions and executes the jobs, however, depending on the apparatus condition, execution of various job operations may or may not be possible, or it may take a long time to execute jobs. Therefore, when jobs are executed merely in accordance with successively sent job operation instructions, it frequently happens that the exact demands of the user cannot be satisfied. In the prior art, for example: (1) When the apparatus executes job operation instructions merely in accordance with the successively received instructions and stops operating for some reason, not only is the present job operation instruction, but also the job operation instructions which follow the present job operation instruction cannot be executed. Accordingly, there is a demand for making possible execution of the job operation instructions which follow even when execution of the present job operation instruction has been stopped; (2) There is a demand for making possible high quality output even when it takes a long time, while at the same time not causing inconvenience to other users by exclusive use of the apparatus; (3) There is a demand for a procedure or method which allows execution of job operation instructions at the lowest cost; (4) There is a demand for making possible output of documents even by stopping the job instruction presently being executed, for example, just before a conference.

Such demands cannot be responded to by the prior art in which job operation instructions are merely executed in accordance with successively generated operation instructions transmitted to the apparatus.

SUMMARY OF THE INVENTION

An object of the present invention is to provide an image processing apparatus and method which overcomes the above-described problems.

Another object of the present invention is to provide an image processing apparatus and method which allow execution of a plurality of jobs in accordance with the demands of the user.

A still another object of the present invention is to provide an image processing apparatus and method which allow execution of a plurality of jobs in accordance with various priority conditions desired by the user.

A further object of the present invention is to provide an image processing apparatus and method which allow execution of jobs at a low cost.

A still further object of the present invention is to provide an image processing apparatus and method which allows execution of jobs, in consideration of the quality output image.

The other objects of the present invention will become apparent from the claims and description given with reference to the attached drawings.

BRIEF DESCRIPTION OF THE DRAWINGS

FIGS. 5A and 5B are flowcharts illustrating job processing in accordance with a priority condition;

FIG. 7 shows a re-arranged output queue;

FIG. 8 is a flowchart illustrating job processing in accordance with a priority order;

FIG. 10 shows a re-arranged output queue;

DETAILED DESCRIPTION OF PREFERRED EMBODIMENT

<Arrangement of Multifunctionable Image Processing Apparatus of an Embodiment>

Figure 1:
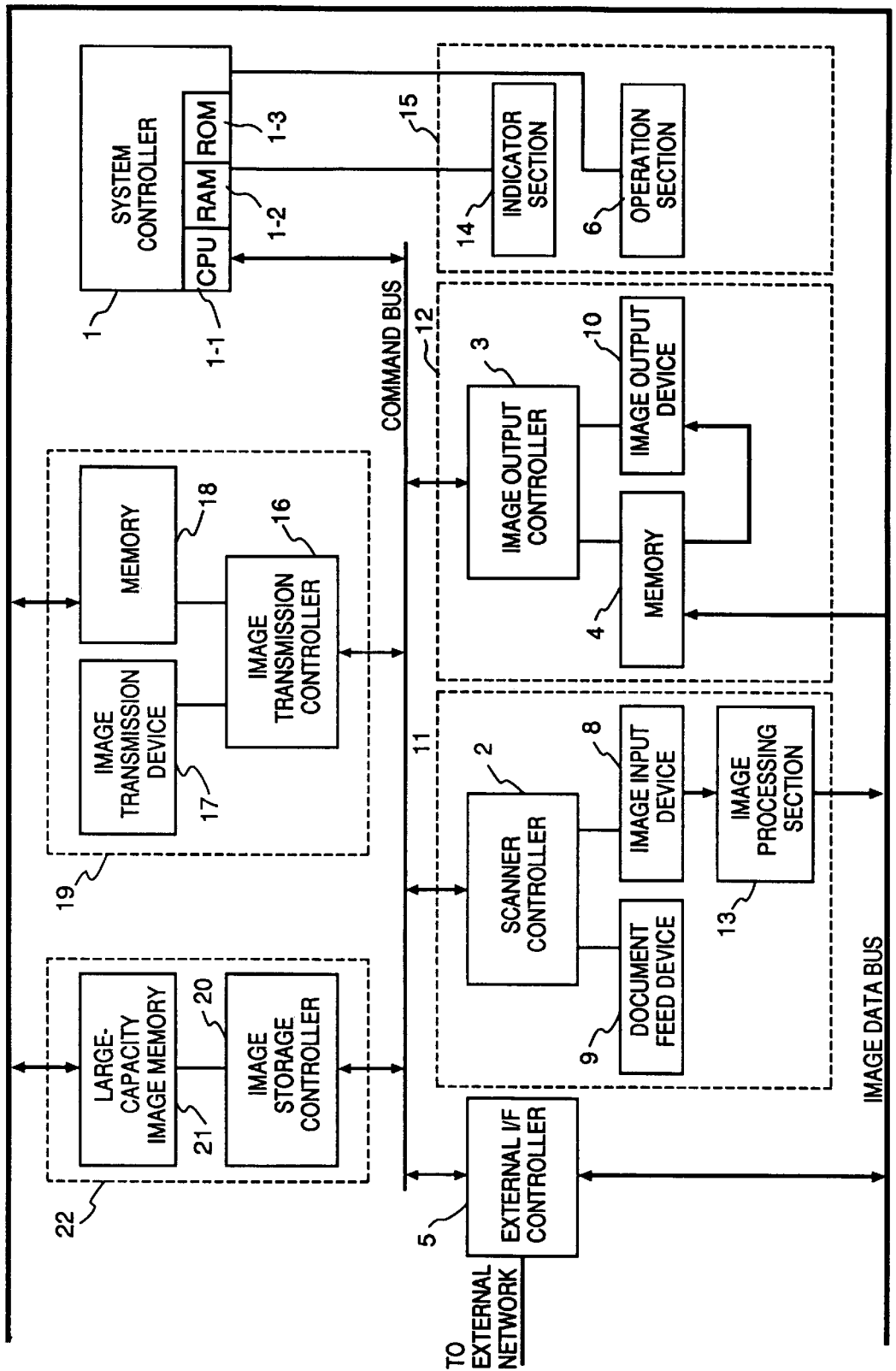
FIG. 1 is a block diagram of an arrangement of an image processing system of an embodiment of the invention.

FIG. 1 is a block diagram of an arrangement of an image processing system of an embodiment of the present invention.

Referring to the figure, reference numeral 1 denotes a system controller for controlling the operation of the entire image processing apparatus and comprises a CPU for computing and controlling, ROM for storing control procedures, and RAM for auxiliary storage. Based on the information input by the operator using an operation section 6, the system controller controls and manages the entire system. Reference numeral 2 denotes a scanner controller for controlling image input device 8 which reads a document image and outputs the image data, a document feed device 9 which feeds a plurality of documents to a reading position of the image input device 8, and image processing section 13 which edits the image data output from the image input device 8. Reference numeral 3 denotes an image output controller for controlling a large-capacity memory 4 and an image output device 10 including a cassette holding a plurality of types of recording paper, which makes visible an image data on the recording paper by a print command and outputs this image. Reference numeral 5 denotes an external interface controller for controlling sending/reception of data to/from an external interface such as LAN, which is internally provided with such functions as interpreting a device control command included in the data received therein, and interpreting page description language to produce an image data, followed by sending out of this image data to an image data bus. Reference numeral 11 denotes a scanner section which indicates the portion up to where image reading and image processing performed by an image processing section 13 are carried out; reference numeral 12 denotes an image output section; and reference numeral 15 denotes a panel section.

Reference numeral 19 denotes an image transmission section for sending to and receiving data from communication devices at remote areas through public lines. It is so constructed as having an image memory 18 which takes in the image read by the scanner 11 through the image data bus, an image transmission controller 16 for receiving the transmission mode setting from the system controller 1 through the command bus and controlling the sending of the image input in the aforementioned image memory 18, etc.

An image storage device 22 is a device for storing image data input from the scanner 11, the image transmission section 19, the external storage device, etc., which is so constructed as having a large-capacity image memory 21 for storing image data received through the image data bus, and an image storage controller 20 for receiving storage and read-out instructions through a command bus and controlling the large-capacity image memory 21.

The system is capable of sending and receiving data to and from a host computer connected to a network through the aforementioned external interface controller.

Figure 2:
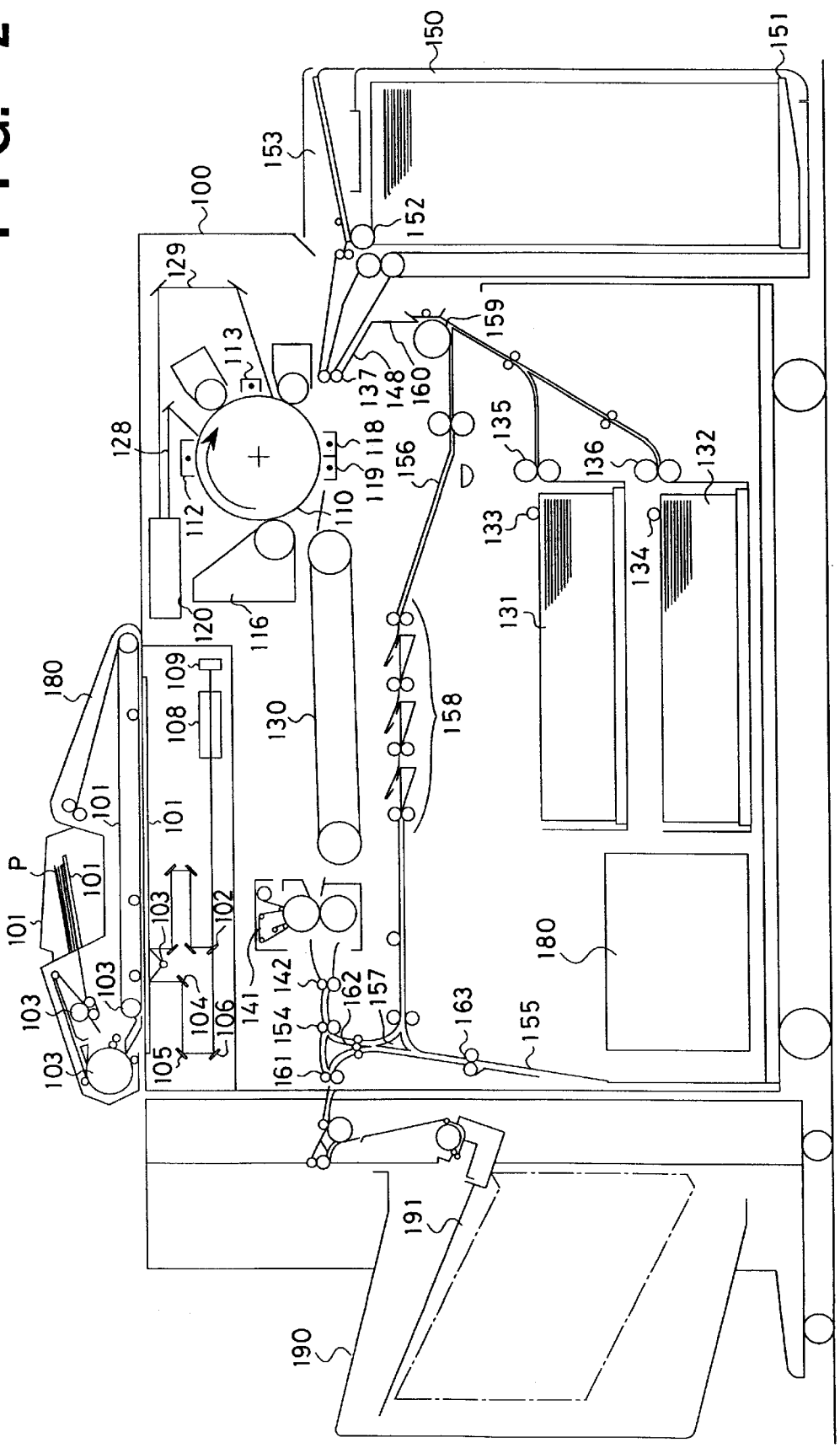
FIG. 2 is a cross sectional view of a multifunctionable image processing apparatus of an embodiment of the invention.

FIG. 2 is a cross sectional view of the image forming apparatus of FIG. 1. A description will be given with the driving of a printer taken as an example of an operation of the apparatus. In the specification, although a detailed description will not be given of the scanner and copying machine operations, the technical idea of the present invention applies to the control operations of peripheral machines including scanners and copying machines.

The aforementioned external interface controller 5 receives printer output data from an external host computer through a network. The external interface controller 5 includes a printer output image producing device (not illustrated) at which a generation of an image data is followed by communication with the system controller 1 and the image output controller 3 through the command bus in FIG. 1, so as to transfer this image data through the image data bus.

This image data is transferred to a laser drive circuit 120 of FIG. 2. When it is being transferred, the image data is converted into a laser modulation signal by the image output device 10, and the laser irradiates a photosensitive body 110 in accordance with the signal. A latent image formed on the photosensitive body is subjected to the ordinary electrophotographic process, and the resulting image is transferred onto a paper sheet for output fed from, for example, sheet feed sections 131 and 132. The paper sheets for output having transferred thereon the image passes through a transportation section 130, after which the imaged transferred thereon is subjected to fixation at a fixing section 141. The paper sheet with the fixed image passes through transportation rollers 142, 154, and 161, and is discharged to the outside the apparatus.

Several optional devices are removable with respect to this image forming apparatus.

In FIG. 2, they are a large-capacity sheet feeder 150, a two-sided printing sheet transportation unit, and a sorter 190. The large-capacity sheet feeder 150 operates in the same manner as the aforementioned sheet feed sections 131 and 132. Sheets for output are sent to the two-sided printing sheet transportation paths 156 and 158 by making the edge of the sheet pass a transportation roller 152 to send the sheet downward by means of a first transportation path switching member 162. Then, after the front and back sides of the sheet is reversed in a reversal transportation path by means of a second transportation path switching member 157, the sheet is once again sent to the two-sided printing transportation paths 156 and 158 by means of the member 157. To print an image onto the back side of a sheet, the sheet is sent out from the two-sided printing transportation path 156 as is done when a sheet is transported from an ordinary sheet feed section.

When the sorter 190 is used, the sheet passes the transportation roller 161 and is sorted in a sorter bin. This sorter 190 has a stapling device, which allows each bundle of sorted sheets to be respectively stapled. The external IF controller 5, the system controller 1, the image transmission section 19, and the image storage device 22, illustrated in FIG. 1, are provided in a case 180.

<Procedure for Operating Multifunctionable Image Forming Apparatus of an Embodiment>

COMPARATIVE EXAMPLE

Figure 3A:
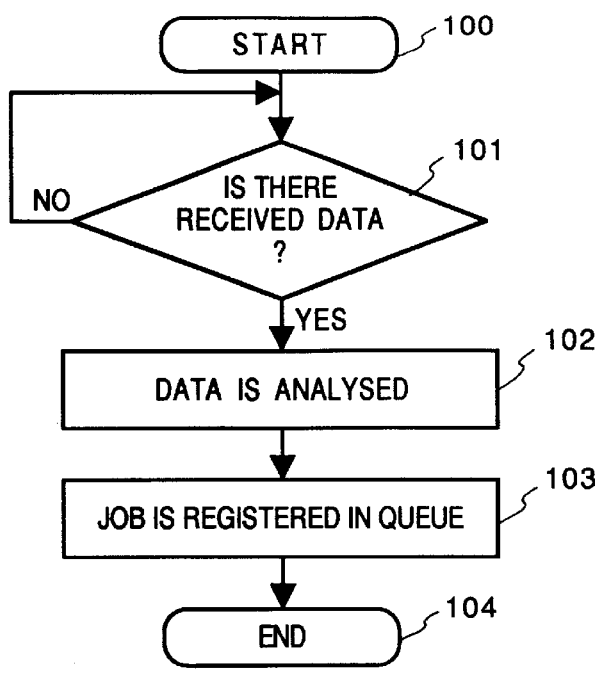
FIGS. 3A and 3B are flowcharts illustrating a conventional job processing procedure.
Figure 3B:
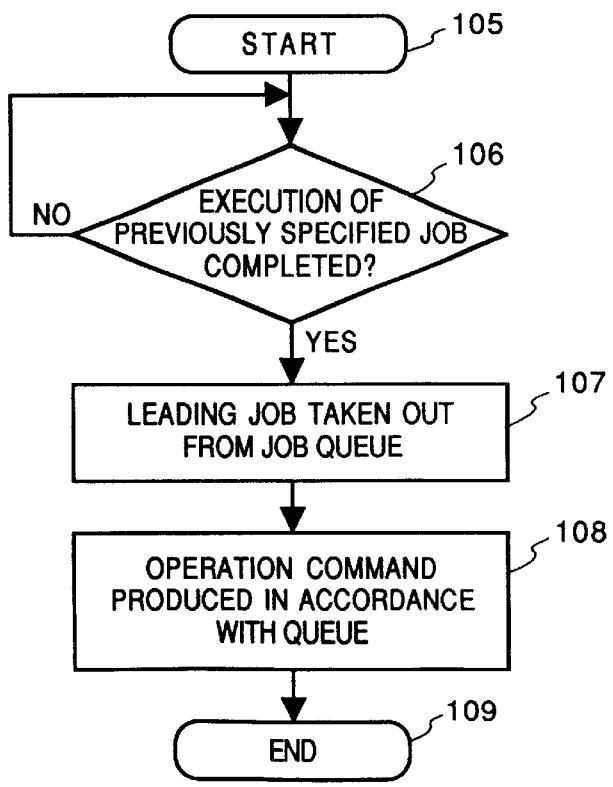

With reference to FIGS. 3A and 3B, a description will be given of an operation based on the usual prior art output instruction not including priority instructions. Here, FIG. 3A represents a data analysis routine and FIG. 3B represents a job control routine. These routines are stored in ROM (not illustrated) of the external I/F controller 5 or ROM 1-3 of the system controller 1.

Figure 4:
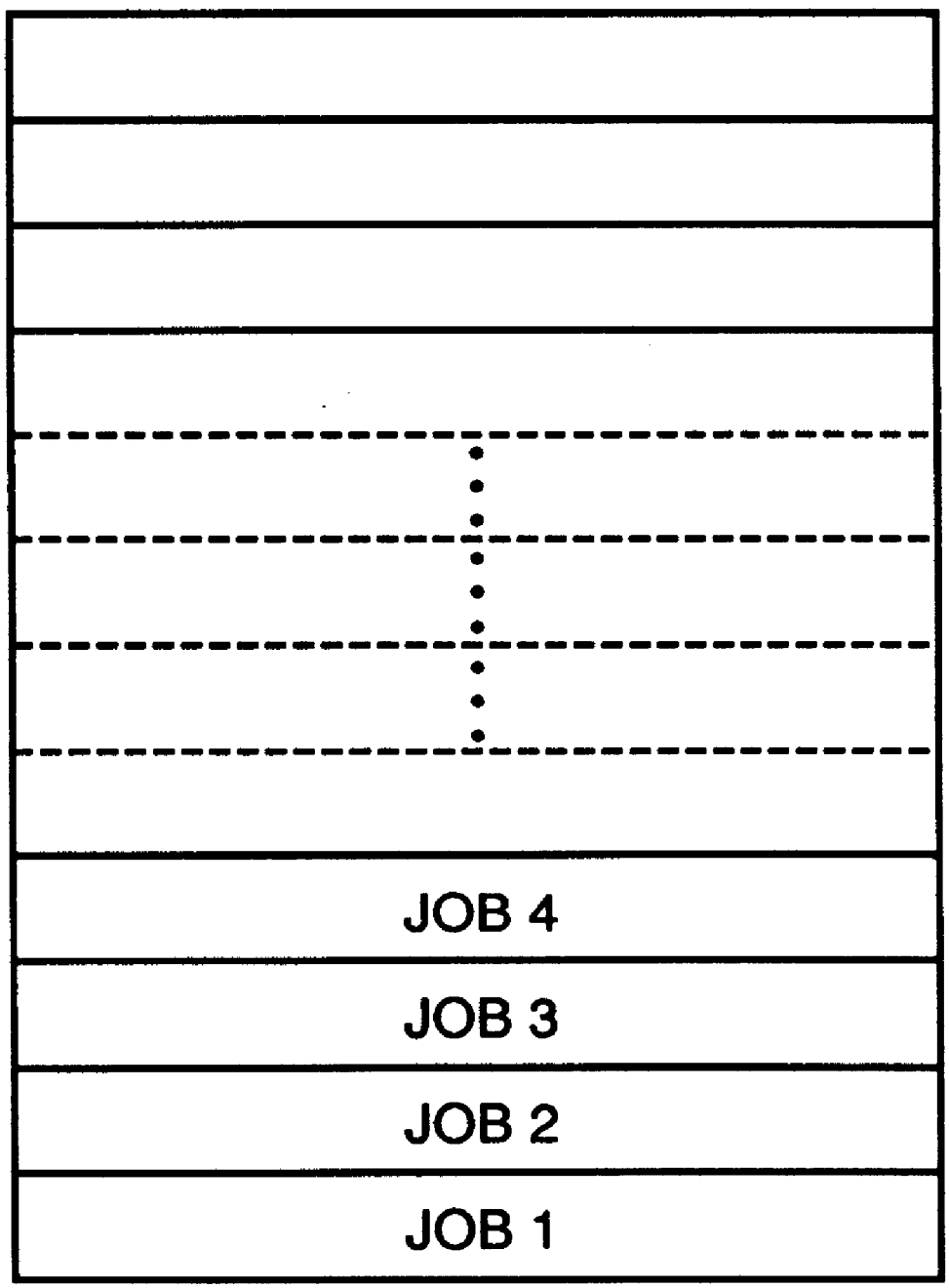
FIG. 4 is conceptual view of an output queue.

In the data analysis routine, in 101, the external I/F controller 5 monitors whether or not job operation instruction data has been sent into the system from equipment connected to a network. When data is detected, the content thereof is analyzed in (102), converted to an operatable job format, and transferred to the system controller 1. The system controller 1 registers the received job operation instruction in a queue in (103). Queue refers to the area in RAM 1-2 where the order of the data processing, determined by the CPU 1-1 included in the system controller 1, is stored. FIG. 4 is a conceptual view thereof, which illustrates Jobs 1 to 4 left arranged in the order they were registered.

In the job control sequence, the CPU 1-1 waits for the completion of the execution of the previously specified job currently being executed in (106), and takes out the leading job from the job queue in (107). Here, in FIG. 4, job 1 corresponds to the leading job. Based on the job control instruction taken out from the queue, the CPU1-1 gives an instruction to select an appropriate device in the system. The jobs used include, for example, the job of forming an image on a plurality of recording sheets and stapling these recording sheets, and the job of directly transmitting an image to the called apparatus without forming the image on the recording sheets. There are data regarding instructions for various setting operations such as data setting, stapling operation setting, and image transmission setting included in operation instruction data of such jobs.

A description will be given of the operation of the embodiment based on the aforementioned description.

FIGS. 5A and 5B are flowcharts of a job processing performed by the system controller 1 in accordance with priority conditions, wherein FIG. 5A represents a data analysis routine, and FIG. 5B represents a job control routine. The description of the data analysis routine will be omitted, since it is the same as in FIG. 3A.

Figure 6:
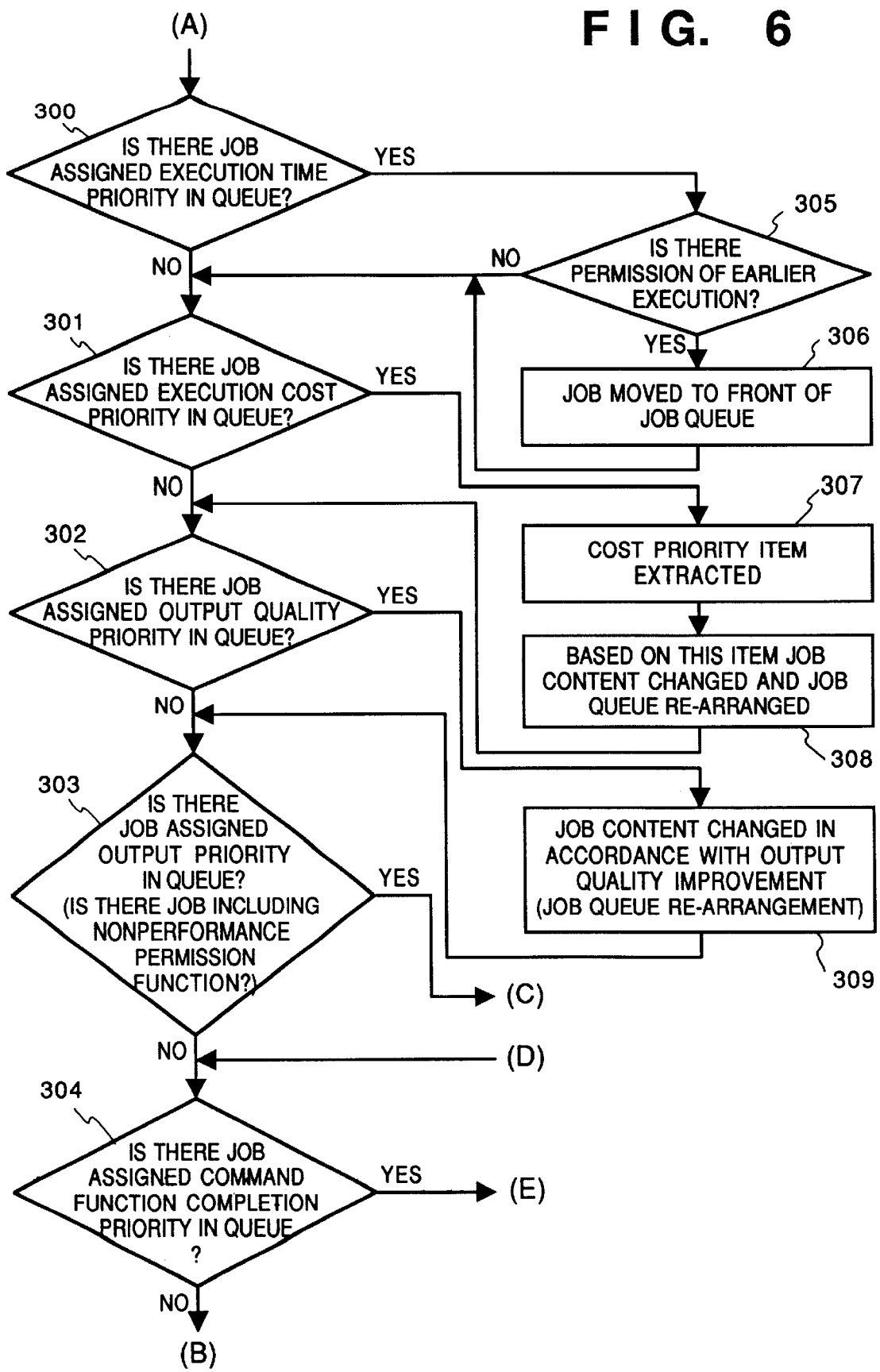
FIG. 6 is a flowchart illustrating job processing in accordance with a priority condition.

In the job control routine of in FIG. 5B, in 206, the CPU1-1 searches whether or not there is a job assigned priority among the jobs registered in the job queue. If there is a job assigned priority, the CPU1-1 proceeds to branch (A) in the figure to change the queue state and the job state based on the specified priority conditions. The processings performed in branch (A) of FIG. 5B is shown in the flowchart of FIG. 6. In FIG. 6, the processings are divided in accordance with the priority condition content.

(Execution Time Priority)

A description will be given of the case when there is a job assigned time priority. A job assigned time priority is that which must be processed before other jobs such as when document copies need to be quickly provided because a conference is drawing near. In the embodiment, when a time priority is specified, a job execution queue is rewritten. More specifically, the order of the jobs in the queue are rearranged at a moment when a job assigned time priority is added to the queue.

In (300), when such a job is detected, then, in (305) the CPU1-1 judges whether or not the present priority specification is effective. This judgment is done to avoid the priority specification from becoming less effective, which occurs when every user is allowed to give an instruction to execute a job earlier, so that all users are capable of employing a priority specification. Accordingly, the CPU1-1 limits priority specification by requiring the user to input a password or the like, so as to allow priority specification to be performed in limited cases. In (306), the CPU1-1 only rearranges a job in the queue which has satisfies the limitations for priority specification.

FIG. 7 is a conceptual view illustrating rearrangement of the jobs of an actual queue. This allows only limited time priority specifications to be executed.

(Execution Cost Priority)

A description will be given of the case when a job assigned execution cost priority is to be executed. Execution cost priority refers, for example, to the case where the image transmission is automatically capable of performing during night as long as he specifies cost priority, without the user specifying night-time transmission, because it is obvious that costs are reduced when advantage is taken of night-time discount for image transmission using telephone lines.

In the embodiment, this is achieved by transferring a job assigned such a cost priority from the ordinary output processing queue to a specification time waiting queue. First, in (307), the CPU1-1 extracts a cost priority item from the ordinary output processing queue. In the accordance with the above-described example, this corresponds to when a transmission time period specified by user is automatically selected. When a cost priority specification is given, changes in job content and queue re-arrangement are performed based thereupon in (308).

In the aforementioned example, since the image transmission time period is changed to a night-time discount time period, the job is transferred from the current output queue to the time waiting queue along with the specified time. FIG. 8 is a conceptual diagram illustrating an actual transfer of a job to another queue. With the specified time made settable by, for example, a system manager, changes can be made in the specification time.

(Output Quality Priority)

A description will be given of the case when a job is assigned higher output quality priority. Output quality priority refers, for example, to the case where higher resolution needs to be achieved of an image data to be generated based on the page description language. Ordinarily, a higher resolution causes the time required for image data generation to be increased as a square of the resolution ratio. If the arrangement is made such as to allow switching of the resolution specification in accordance with priority conditions, ordinary documents or the like can be output at a low resolution to save output time, so that images given higher quality priority alone can be output at a high resolution.

When such a priority specification is detected in (302), the contents of the jobs are changed in accordance with higher output quality priority in (309). For example, a higher resolution than ordinary resolutions are set. When such a priority specification is given, automatically adding a processing for delaying the job output order (time) makes possible rescheduling of job processings in which jobs which require time to be processed can be processed when the apparatus is free, while other jobs are processed first.

(Nonperformance Permission Specification)

A description will be given of the case when the nonperformance permission function is specified. Specifying the nonperformance permission function refers, for example, to the case in which even when a function to staple sorted printed recording paper is specified, nonperformance approval permission specification of such functions, when there is recording paper of previous jobs remaining in the sorter, allows sorting/stapling to be carried out with respect to the discharged recording sheets on an usable bins (with no remaining recording paper) and with respect to output in excess of this amount, discharging of sheets to a non-sorting tray without these sheets being subjected to sorting/stapling. In addition to nonperformance permission specification of such functions, nonperformance permission specification of two-sided recording function can be performed, so that when a unit necessary for executing two-sided recording is defective or when paper gets stuck in the apparatus, this function can be deleted and then executed, thereby allowing troubles in the apparatus to be solved.

Figure 9:
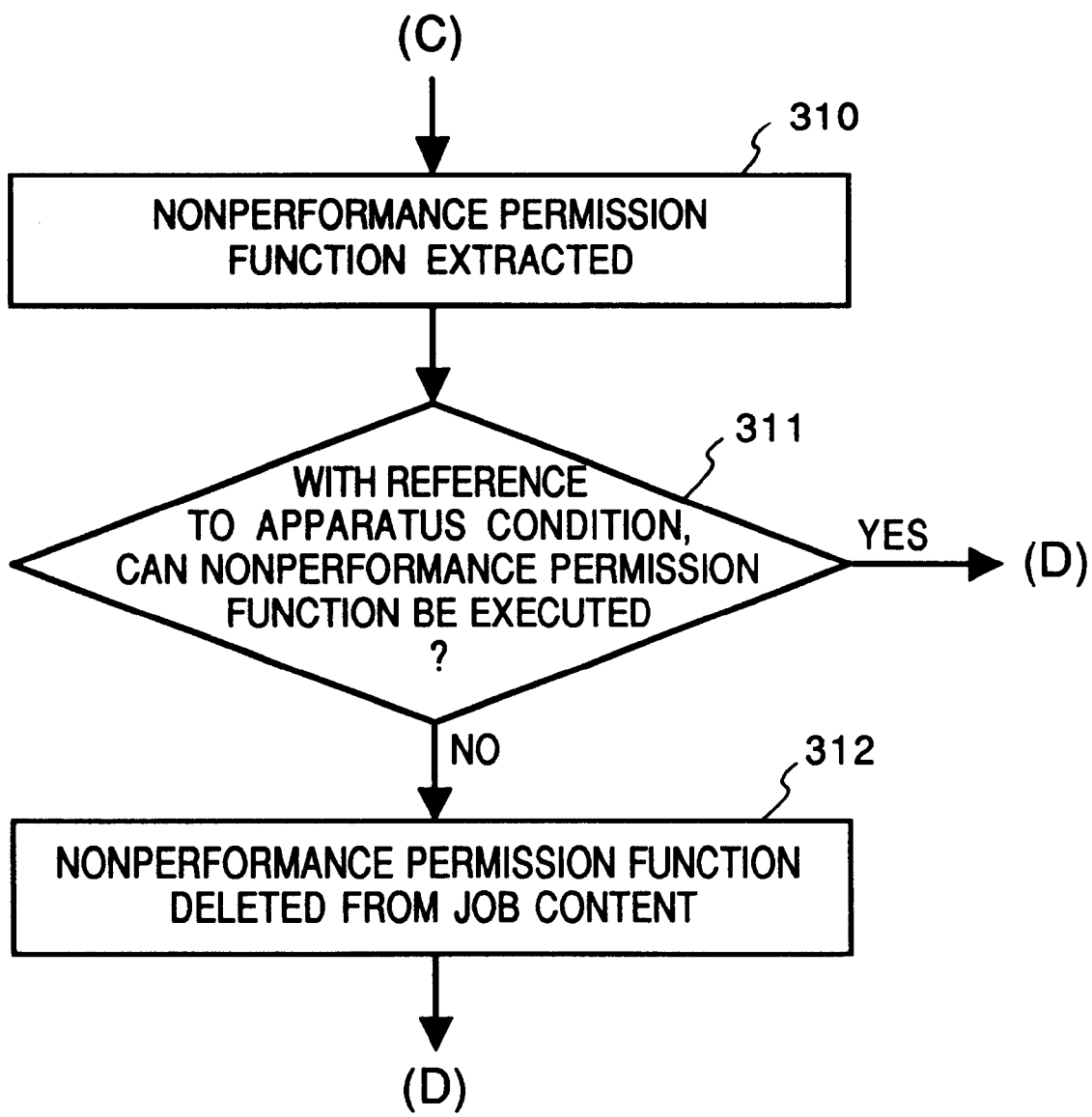
FIG. 9 is a flowchart illustrating job processing in accordance with a priority condition.

FIG. 9 is a flowchart illustrating nonperformance permission specification processing. In (303), when there is a nonperformance approval specification of a function, in (310), the CPU1-1 extracts the job given a nonperformance permission specification. Checking the condition of the apparatus, a determination is made as to whether or not, at present, this function can be executed, in (311). When it can be executed, nothing is done and the process is returned, while, on the other hand, when it cannot be executed, the function is deleted from the job content in (312). In this way, skipping functions of lower priority in accordance with the condition of the apparatus allows quick image formation independent of the condition of the apparatus.

(Function Completion Specification)

A description will be given of the case when a function completion priority specification is given. Such specification is regarded as a standard function in an ordinary apparatus. In the present embodiment, for example, when a specified function, such as two-sided recording cannot be utilized due to apparatus trouble or paper stuck in the apparatus, this job is temporarily eliminated from the queue and the other jobs are executed prior thereto. In FIG. 6, processing jobs in accordance with function completion specification makes it possible to respond to output demands made by the user. FIG. 10 illustrates the state of the queue when job 2 enters into a waiting state.

Figure 11:
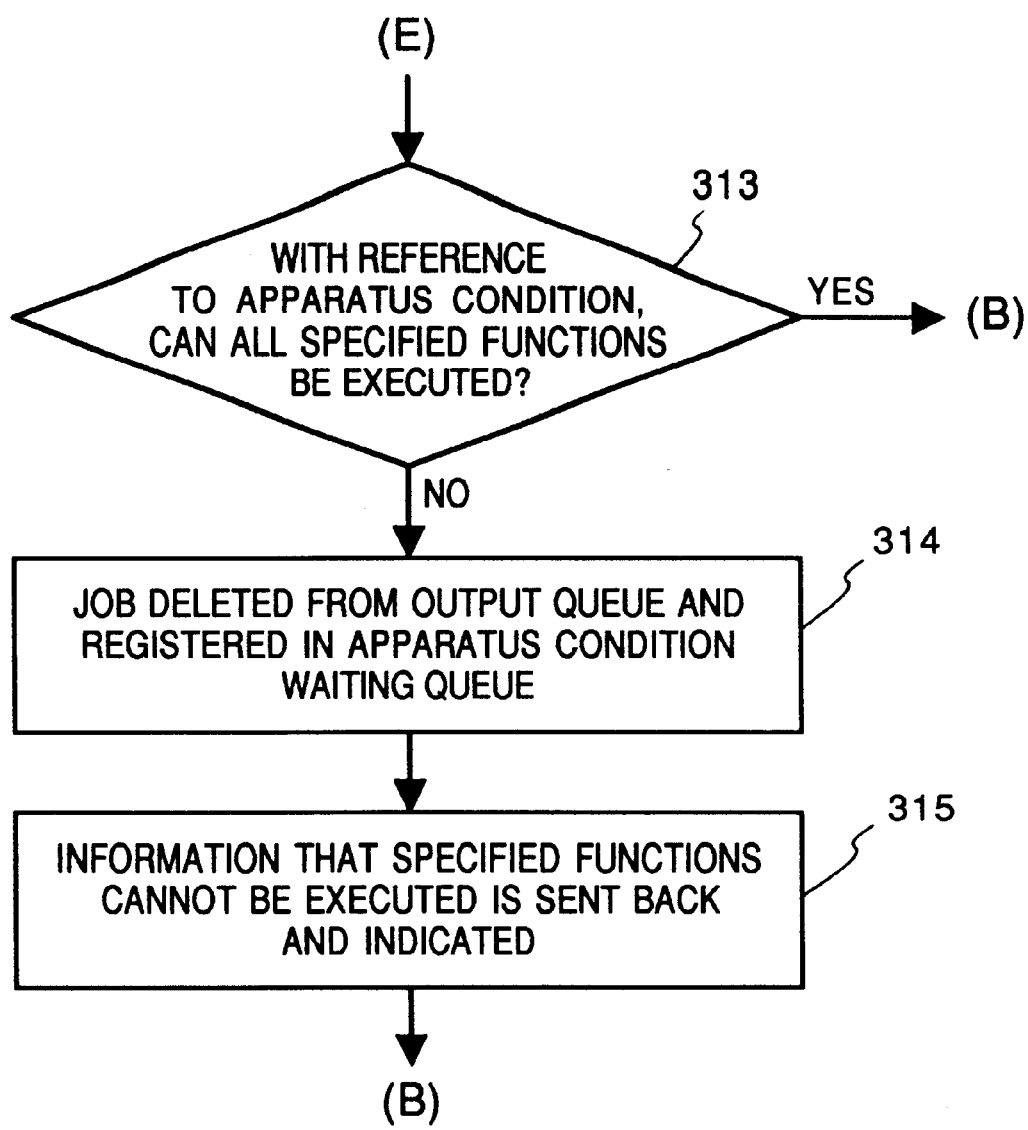
FIG. 11 is a flowchart illustrating job processing in accordance with a priority condition.

FIG. 11 is a flowchart of the processing of the function completion specification.

When there is a function completion specification in (304), the CPU1-1 determines whether or not all of the specification functions can be executed in (313). If there is a function which cannot be executed, this job is eliminated from the output queue and registered in a waiting queue in (314), after which the function which cannot be executed is returned to the job specification destination and indicated in (315). Here, the job specification destination refers to machines such as computers connected to a network, or operation section 6 or display section 14 of an image forming apparatus. In this way, jobs which cannot be executed are put in a waiting state and skipped, so as to allow executable jobs in the output queue to be executed prior thereto. This prevents the stopping of the job being executed from affecting the execution of other jobs.

The jobs transferred to the waiting queue are at all times monitored in the job control routine of FIG. 5. When the apparatus condition is that which allows job execution, so that the apparatus condition is restored to that which allows execution of a function determined in (313) as being not executable, this job is returned back to the output queue in (212), thereby making possible execution of the job function.

In the present embodiment, although each of the priority conditions were determined in FIG. 6, these are not to be construed as limitative because it is obvious that they change depending on the apparatus use or structure. Control by a combination of a plurality of conditions is possible. Although, in the present embodiment, a method for controlling a multifunctionable image processing apparatus has been described, it is obvious that the technical ideas of the present invention can be applied to other multifunctionable apparatuses. Further, the present invention is applicable to a system constructed from a plurality of devices as well as to a system constructed from only one device. Still further, it is obvious that the present invention is applicable to cases in which the present effect is achieved by supplying a program to a system or apparatus.

The present invention is not limited to the above-described embodiment. Accordingly, various modifications can be made within the scope of the claims.

What is claimed is:

1. A data processing method comprising the steps of:
   a) inputting job instructions;
   b) storing the job instructions inputted in said step (a) into a memory; and
   c) determining an order of execution of a plurality of jobs, wherein said step (c) includes the step (c-1) of discriminating whether or not a job corresponding to a job instruction inputted in said step (a) can be executed before starting to execute the job, and the step (c-2) of skipping a job which is discriminated to be inexecutable in the step (c-1),
   wherein the job instruction inputted in said step (a) includes a priority condition for giving a priority to a corresponding job, and
   wherein in said step (c), when the priority condition is that a cost required for execution of image processing should be relatively low, the job execution order is determined such that a job given priority is executed during lower cost hours.

2. A data processing method comprising the steps of:
   a) inputting job instructions;
   b) storing the job instructions inputted in said step (a) into a memory;
   c) determining an order of execution of a plurality of jobs, wherein said step (c) includes the step (c-1) of discriminating whether a job corresponding to a job instruction inputted in said step (a) can be executed or cannot be executed as a result of an error status before starting to execute the job, and a step (c-2) of skipping a job which is discriminated to be inexecutable as a result of the error status in the step (c-1); and
   d) informing of an inexecutable function of the job skipped in the step (c-2) to an instruction source that issued the job instruction inputted in said step (a).

3. A data processing method according to claim 2, wherein in said step (b) the job instructions are stored in the memory in an order in which they were input.

4. A data processing method according to claim 3, wherein the job instructions stored in the memory have their order re-arranged in accordance with the execution order determined in said step (c).

5. A data processing method according to claim 2, wherein the job instruction inputted in said step (a) includes a priority condition for giving a priority to a corresponding job.

6. A data processing method according to claim 5, wherein the priority condition is determined by the operator.

7. A data processing method according to claim 5, wherein in said step (c), when the priority condition is in accordance with shortening a length of time that a job is left waiting until image processing execution is completed, the job execution order is determined such that a job given priority is executed prior to other jobs.

8. A data processing method according to claim 5, wherein in said step (c), when the priority condition is in accordance with improving image quality after image processing, a job in which quality needs to be improved is placed after other jobs in the execution order.

9. A data processing apparatus comprising:
   input means for inputting job instructions;
   a memory for storing a plurality of job instructions inputted by said input means;
   determining means for determining an execution order of a plurality of jobs based on the job instructions inputted by said input means, wherein said determining means includes discrimination means for discriminating whether a job according to a job instruction inputted by said input means can be executed or cannot be executed as a result of an error status before starting to execute the job, and skipping means for skipping a job which is discriminated to be inexecutable by the discrimination means as a result of the error status; and
   notification means for informing of an inexecutable function of the job skipped in by the skipping means to an instruction source that issued the job instruction inputted by said input means.

10. A data processing apparatus according to claim 9, wherein said memory stores the job instructions in an order in which they were inputted by said input means.

11. A data processing apparatus according to claim 10, wherein said determining means re-arranges the order of the plurality of job instructions stored in said memory in accordance with the determined execution order.

12. A data processing apparatus according to claim 9, wherein the job instruction inputted by said input means includes a priority condition for giving a priority to a corresponding job.

13. A data processing apparatus according to claim 12, wherein, when the priority condition is in accordance with shortening a length of time that a job is left waiting until completion of image processing, said determining means determines the execution order such that a job given priority is executed prior to other jobs.

14. A data processing apparatus according to claim 12, wherein, when the priority condition is in accordance with improving image quality after image processing, said determining means places a job given priority after other jobs in the execution order.

15. A data processing apparatus comprising:
   input means for inputting job instructions;
   a memory for storing a plurality of job instructions inputted by said input means; and
   determining means for determining an execution order of a plurality of jobs based on the job instructions inputted by said input means, wherein said determining means includes discrimination means for discriminating whether or not a job according to a job instruction inputted by said input means can be executed before starting to execute the job, and skipping means for skipping a job which is discriminated to be inexecutable by the discrimination means, wherein the job instruction inputted by said input means includes a priority condition for giving a priority to a corresponding job, and wherein, when the priority condition is that a cost required for executing of image processing should be relatively low, said determining means determines the execution order such that a job given priority is executed during lower cost hours.

16. A data processing apparatus comprising:

input means for inputting a job instruction including a priority condition;

discrimination means for discriminating whether or not the job instruction inputted by said input means includes an indication for reducing a processing cost of a corresponding job; and determination means for determining an execution order of jobs corresponding to job instructions inputted by said input means such that a cost of the corresponding job is reduced, when said discrimination means discriminates that the job instruction includes the indication for reducing the processing cost.

17. A data processing apparatus according to claim 16, further comprising a memory for storing a job instruction discriminated by said discrimination means as including the indication for reducing the processing cost.

18. A data processing apparatus according to claim 16, wherein said determination means determines the execution order of jobs such that a transmission job is executed during hours in which a data communication charge is inexpensive.

19. A data processing apparatus according to claim 16, wherein, when the job instruction inputted by said input means does not include a priority condition for reducing the processing cost, said determination means determines the execution order of jobs in order of input by said input means.

20. A data processing apparatus comprising:

input means for inputting a job instruction for a corresponding job;

setting means for setting a mode in which a change of contents of the corresponding job is allowed in accordance with a kind of job corresponding to the job instruction inputted by said input means;

discrimination means for discriminating whether or not the job corresponding to the job instruction inputted by said input means can be executed; and control means for changing contents of a job discriminated to be inexecutable by said discrimination means when the mode is set by said setting means.

21. A data processing apparatus according to claim 20, wherein, when said discriminating means discriminates that the job is inexecutable because of utilization of a predetermined function, said control means changes the utilization of the predetermined function.

22. A data processing apparatus according to claim 21, wherein, when said discriminating means discriminates that the job is inexecutable because of the utilization of the predetermined function, said control means changes the contents so as to execute the job without using the predetermined function.

23. A data processing apparatus according to claim 20, wherein said control means changes an output form of an output job based on the job instruction inputted by said input means.

24. A data processing method comprising the steps of:

inputting a job instruction including a priority condition;

discriminating whether or not the job instruction inputted in said inputting step includes an indication for reducing a processing cost of a corresponding job; and determining an execution order of jobs according to job instructions inputted in said inputting step such that the cost of the corresponding job is reduced, when said discrimination step discriminates that the job instruction includes the indication for reducing the processing cost.

25. A data processing method according to claim 23, further comprising the step of storing a job instruction discriminated in said discriminating step as including the indication for reducing the processing cost.

26. A data processing method according to claim 24, wherein, in said determining step, the execution order of jobs is determined such that a transmission job is executed during hours in which a data communication charge is inexpensive.

27. A data processing method according to claim 24, wherein, in said determination step, the execution order of jobs is determined to be an input order in said inputting step, when the job instruction inputted in said inputting step does not include a priority condition for reducing the processing cost.

28. A data processing method comprising the steps of:

inputting a job instruction for a corresponding job;

setting a mode in which a change of contents of the corresponding job is allowed in accordance with a kind of job corresponding to the job instruction inputted in said inputting step;

discriminating whether or not the job corresponding to the job instruction inputted in said inputting step can be executed; and changing contents of a job discriminated to be inexecutable in said discriminating step when the mode is set in said setting step.

29. A data processing method according to claim 28, wherein, when said discriminating step discriminates that the job is inexecutable because of utilization of a predetermined function, said changing step changes the utilization of the predetermined function.

30. A data processing method according to claim 29, wherein, when said discriminating step discriminates that the job is inexecutable because of the utilization of the predetermined function, said changing step changes the contents so as to execute the job without using the predetermined function.

31. A data processing method according to claim 28, wherein, in said changing step, an output form of an output job based on the job instruction inputted in said inputting step is changed.

32. A computer-readable storage medium storing a program for implementing a method for controlling a data processing apparatus, the program comprising:

program code for an input step of inputting job instructions;

program code for a storage step of storing the job instructions inputted in the input step into a memory;

program code for as discrimination step of discriminating whether a job corresponding to a job instruction inputted in the input step can be executed or cannot be executed as a result of an error status before starting to execute the job;

program code for a determination step of determining an order of execution of a plurality of jobs, wherein the determination step includes a job-skip step of skipping a job which is discriminated to be inexecutable as a result of the error status in said discriminating step; and program code for a notification step of informing of an inexecutable function of the job skipped in the job-skip step to an instruction source that issued the job instruction inputted in the input step.

33. A computer-readable storage medium storing a program for implementing a method for controlling a data processing apparatus, the program comprising:

program code for an input step of inputting a job instruction including a priority condition;

program code for a discrimination step of discriminating whether or not the job instruction inputted in the input step includes an indication for reducing a cost of a corresponding job; and program code for a determination step of determining an execution order of jobs according to job instructions inputted in the input step such that the cost of the corresponding job is reduced when the discrimination step discriminates that the job instruction includes the indication for reducing the cost.

34. A computer-readable storage medium storing a program for implementing a method for controlling a data processing apparatus, the program comprising:

program code for an input step of inputting a job instruction for a corresponding job;

program code for a mode setting step of setting a mode in which a change of contents of the corresponding job is allowed in accordance with the kind of job corresponding to the job instruction inputted in the input step;

program code for a discrimination step of discriminating whether or not the job corresponding to the job instruction inputted in the input step can be executed; and program code for a change step of changing contents of a job discriminated to be inexecutable in the discrimination step when the mode is set in the mode setting step.

35. A computer-readable storage medium storing a program for implementing a method for controlling a data processing apparatus, the program comprising:

program code for an input step of inputting job instructions;

program code for a storage step of storing the job instructions inputted in the input step into a memory; and program code for a determination step of determining an order of execution of a plurality of jobs, wherein the determination step includes a discrimination step of discriminating whether or not a job corresponding to a job instruction inputted in the input step can be executed before starting to execute the job, and a job-skip step of skipping a job which is discriminated to be inexecutable in the discrimination step, wherein the job instruction inputted in the input step includes a priority condition for giving a priority to a corresponding job, and wherein, in the determination step, when the priority condition is that a cost required for execution of image processing should be relatively low, the job execution order is determined such that a job given priority is executed during lower cost hours.

* * * * *

UNITED STATES PATENT AND TRADEMARK OFFICE
CERTIFICATE OF CORRECTION

PATENT NO.   : 6,271,927 B1
DATED        : August 7, 2001
INVENTOR(S)  : Hideto Kohtani et al.

It is certified that error appears in the above-identified patent and that said Letters Patent is hereby corrected as shown below:

<u>Column 10,</u>
Line 12, "claim 23," should read -- claim 24, --.

Signed and Sealed this

Sixteenth Day of July, 2002

*Attest:*

*Attesting Officer*

JAMES E. ROGAN
*Director of the United States Patent and Trademark Office*